Jan. 31, 1967  O. J. SENDISH  3,301,509
OTTOVENT SHROUD SYSTEM
Filed Aug. 26, 1964  2 Sheets-Sheet 1

INVENTOR
Otto J. Sendish

INVENTOR

Otto J. Sendish

United States Patent Office 3,301,509
Patented Jan. 31, 1967

3,301,509
OTTOVENT SHROUD SYSTEM
Otto J. Sendish, Charles County, Md.
(Rte. 1, Box 472, Waldorf, Md. 20601)
Filed Aug. 26, 1964, Ser. No. 392,262
2 Claims. (Cl. 244—42)

This invention relates to an improvement in propeller shrouds. The improvement basically provides for two additional functions of the propeller shroud.

The object of this invention, therefore, is a novel type of propeller shroud incorporating therein a vacuum pump and a velocity control means for high pressure air created by driven air screws or the foward speed of aircraft.

An advantage of this invention is its use as a vacuum pump for a simplified boundary layer control means with an added feature of (when boundary layer is drawn from upper surfaces of wings only) making an aircraft more buoyant by relieving some of the atmospheric pressure from said wing surfaces, with a further end in mind of shorter take-off and landing, smaller wings, simplicity of construction and economy in structural weight.

Another advantage of using this invention is the ease of adapting certain parts of the invention to existing propeller shrouds and ease of maintaining said propeller shrouds is attained by relatively few moving parts.

A benefit of this invention when used at the rear of a fixed wing aircraft is the configuration of a propeller shroud built in accordance with this invention lends itself ideally to modern day aircraft where shorter tail moment arms are required because of weight restrictions in relation to the aircraft center of gravity because of engine placement.

Further additional objects, benefits and advantages of this invention will become evident from a study of the following detailed description taken in conjunction with the accompanying drawings in which.

Figure 1:
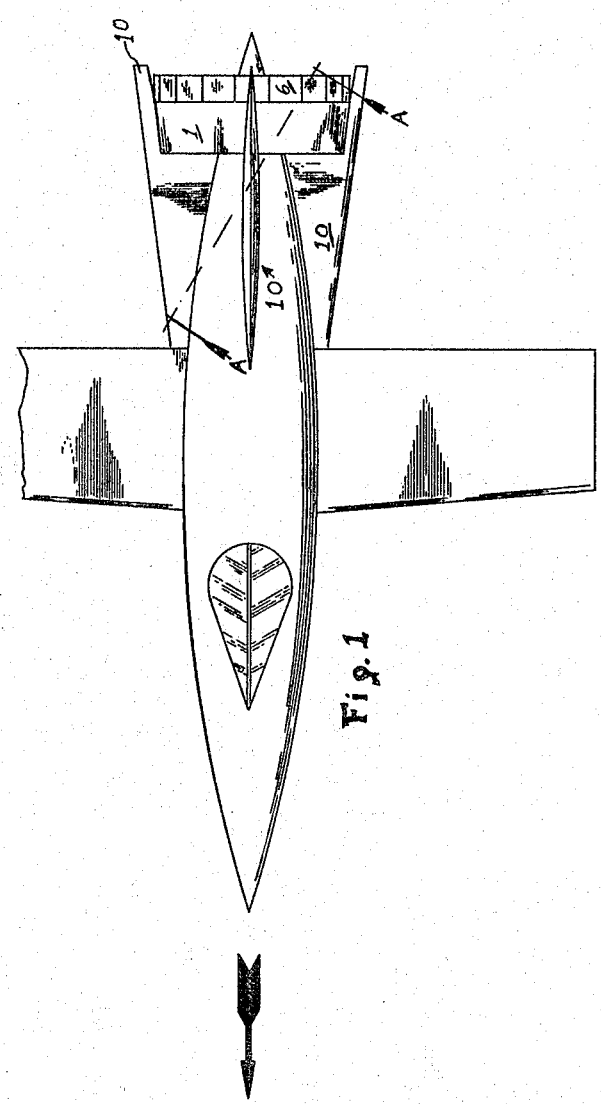
FIGURE 1 is a fragmentary top plan view of one application of this invention to a propeller driven airplane.

Referring now to FIGURE 1, there is shown a "pusher prop" type aircraft and the relationship of the aircraft to a propeller shroud made in accordance with this invention. In this application the propeller or prime mover causes the high pressure in the shroud. In jet engines the driven compressor impeller serves the same purpose in this invention as the conventional propeller. The existing impeller or fan shroud takes the form of the outer enclosure member 1, and is made to utilize the inlet cone 2, the throat 3, the low pressure ports 4, and the diffuser cone 5.

Figure 2:
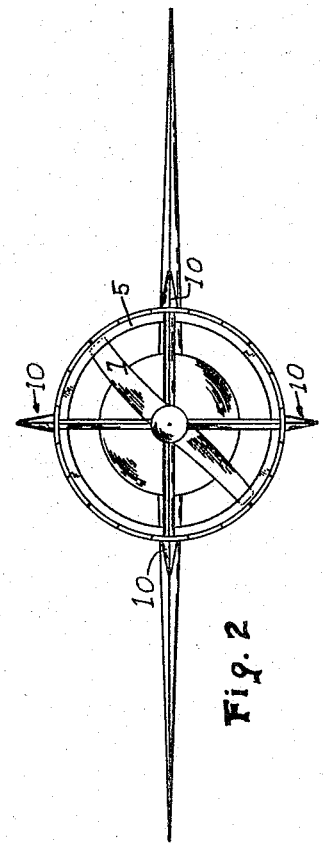
FIGURE 2 is a rear elevation of the same aircraft shown in FIGURE 1.

Referring now to FIGURE 2, which shows a rear view of the same aircraft and the placement of low pressure ducts 10 exteriorly of outer enclosure member 1 and spaced 90 degrees apart.

Figure 3:
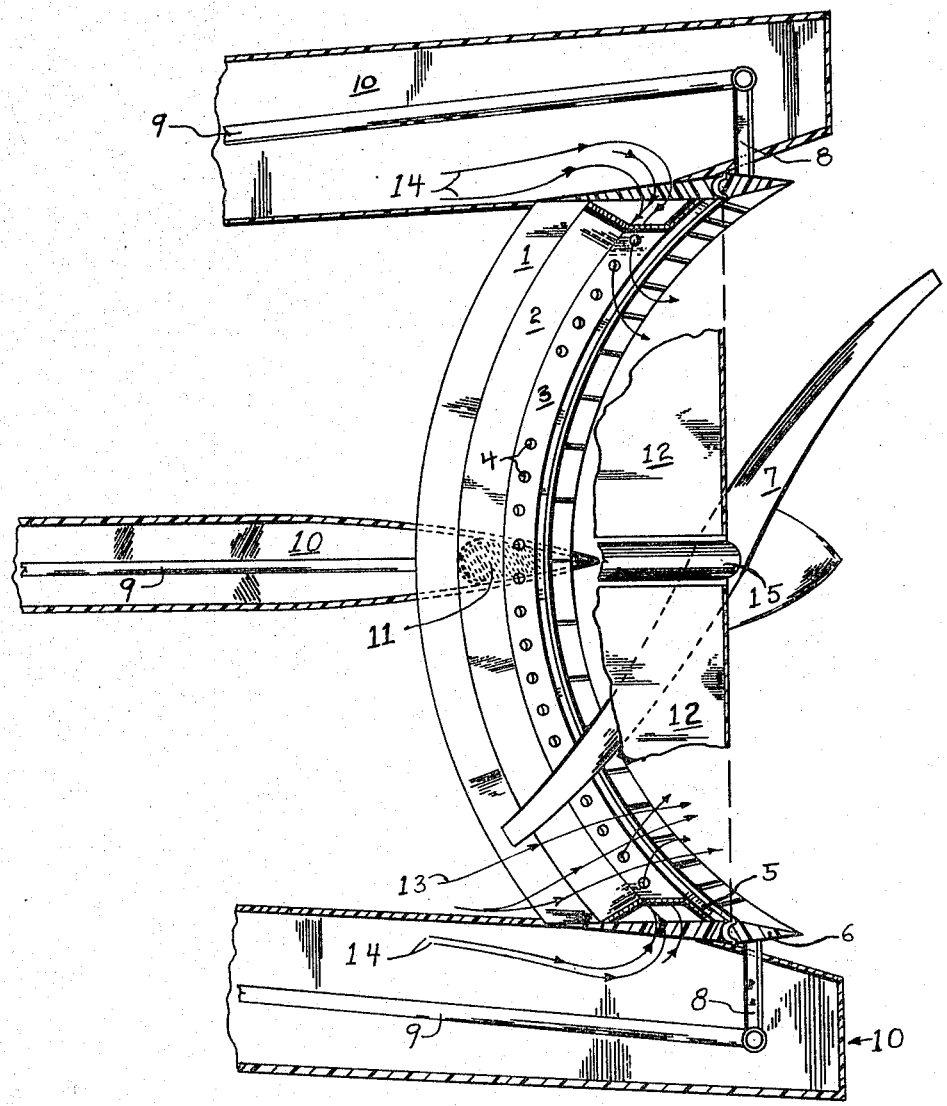
FIGURE 3 is a cross sectional oblique view taken along the line A—A of FIG. 1 with the forward part of the shroud support struts or dorsal struts cut away and the low pressure ducts cut in half.

FIGURE 3 shows the general structure of a propeller shroud made in accordance with this invention and is shown to include a conical shaped outer enclosure member 1 concentrically enclosing therein an inlet cone 2, a tubular shaped throat member 3, low pressure ports 4 in said tubular shaped throat, and a diffuser cone 5.

A driven propeller is made to swing between the inlet of the outer enclosure 1 and immediately upstream of the inlet cone 2. The larger ends of the inner cones 2 and 5 are joined to the outer enclosure 1 at a predetermined distance from its extremities. The throat 3 is made to carry between the smaller ends of the inner cones 2 and 5. The outer enclosure 1 is cut away 11 and makes an inlet for low pressure duct 10 which makes an entrance into the generally hollow wing which forms the conduit for low pressure 14 from the orifices in the wing surfaces to the low pressure ports 4 in the throat 3. In operation, a propeller shroud made in accordance with this invention is made to work as a Venturi tube wherein there is a pressure drop at the area of least cross sectional dimension, as is well known from Bernoulli's theorem. In propeller driven planes the propeller 7 or forward speed of the aircraft causes the high pressure 13. The outer enclosure 1 is made to receive an annularly movably mounted flap 6 that is made to operate uniformly and selectively through control rods 9 passing through duct 10. When moved uniformly, coning outwardly, its aerodynamic effect is as a wing flap on conventionally controlled aircraft but it stabilizes as the way a drag parachute would or it has the effect of an inverted parachute at the rear extremity of the aircraft. This action increases drag, increases lift, while augmenting the vacuum pressure on the inner side of the propeller shroud.

While this invention has been described with particular reference to the construction shown in the drawing and while various changes may be made in the detail construction, it should be understood that such changes shall be within the spirit and scope of the present invention as defined by the appended claims.

Having thus completely and fully described the invention, what is now claimed as new and desired to be protected by Letters Patent of the United States is:

1. A propeller shroud adapted to include the movement of low pressure air by high pressure air and an aircraft attitude control means, a conical shaped outer enclosure member, a cylindrical shaped throat member carried within said conical shaped outer enclosure member a predetermined distance from said outer enclosure member ends and forming an area of least cross sectional dimension and a passageway for said low pressure air, said throat member having a plurality of annularly arranged ports therein and being operable to define a passageway between said throat member and said conical shaped outer enclosure member, conical means connecting the smaller end of said conical shaped outer enclosure member to said cylindrical shaped throat member a predetermined distance from said conical shaped outer enclosure member inlet end and defining an inlet for said high pressure air, a conical shaped diffuser member connecting said cylindrical shaped throat member to the larger end of said conical shaped outer enclosure member a predetermined distance from said conical shaped outer enclosure member outlet end and defining an air outlet for said high and low pressure air, a dorsal strut means connecting said conical shaped outer enclosure member generally ninety degrees around the longitudinal aircraft axis and thereby fixedly securing said conical shaped outer enclosure member and forming therein a propeller shaft housing in which the propeller is held concentrically within said conical shaped outer enclosure member, said conical shaped outer enclosure member having a plurality of exterior low pressure ducts positioned generally ninety degrees apart and fixedly secured to said conical shaped outer enclosure member and having communication to said throat member forming therein a conduit for low pressure air to places of need and fairing for flap control arms and control rods, a plurality of annularly movably mounted flaps, means to move said flaps whereby said flaps are movable uniformly and collectively.

2. A propeller shroud as set forth in claim 1 wherein there is a driven air screw inside of said conical shaped outer enclosure member inlet end and upstream of said conical shaped inlet cone.

References Cited by the Examiner

UNITED STATES PATENTS

| | | | |
|---|---|---|---|
| 1,829,616 | 10/1931 | Stalker | 244—42 |
| 1,913,644 | 6/1933 | Stalker | 244—42 |
| 1,957,413 | 5/1934 | Price | 230—122 |
| 2,892,582 | 6/1959 | O'Rourke | 230—122 |
| 3,054,579 | 9/1963 | Bary | 244—42 |
| 3,108,764 | 10/1963 | Sudrow | 244—34 |
| 3,128,973 | 4/1964 | Darrnenberg | 244—42 |

MILTON BUCHLER, *Primary Examiner.*

B. BELKIN, *Assistant Examiner.*